United States Patent
Baumann et al.

[11] Patent Number: 5,941,281
[45] Date of Patent: Aug. 24, 1999

[54] FLUID PRESSURE REDUCTION DEVICE

[75] Inventors: Hans D. Baumann, Rye, N.H.; Paul J. Schafbuch, Marshalltown, Iowa; Douglas P. Gethmann, Gladbrook, Iowa; Michael M. Anderson, Marshalltown, Iowa; David J. Koester, Gladbrook, Iowa

[73] Assignee: Fisher Controls International, Inc., Clayton, Mo.

[21] Appl. No.: 09/099,186

[22] Filed: Jun. 18, 1998

Related U.S. Application Data

[62] Division of application No. 08/794,470, Feb. 4, 1997, Pat. No. 5,769,122.

[51] Int. Cl.$^6$ ...................................................... F16K 3/24
[52] U.S. Cl. ........................................ 137/625.33; 251/127
[58] Field of Search ............................ 137/625.3, 625.33; 251/127; 138/42

[56] References Cited

U.S. PATENT DOCUMENTS

| Re. 31,105 | 12/1982 | Bates, Jr. . |
|---|---|---|
| Re. 32,197 | 7/1986 | Self . |
| 1,243,134 | 10/1917 | Binckley . |
| 1,650,196 | 7/1927 | Demuth . |
| 2,126,991 | 6/1938 | Griswold . |
| 3,133,557 | 5/1964 | Gongwer . |
| 3,316,936 | 5/1967 | Gongwer . |
| 3,323,550 | 6/1967 | Lee, II . |
| 3,375,855 | 4/1968 | Deeks . |
| 3,451,404 | 6/1969 | Self . |
| 3,513,864 | 5/1970 | Self . |
| 3,514,074 | 5/1970 | Self . |
| 3,529,628 | 9/1970 | Cummins . |
| 3,532,126 | 10/1970 | Boothe . |
| 3,631,891 | 1/1972 | Brumm . |
| 3,678,963 | 7/1972 | Betts et al. . |
| 3,688,800 | 9/1972 | Hayner et al. . |
| 3,722,854 | 3/1973 | Parola . |
| 3,780,767 | 12/1973 | Borg et al. . |
| 3,802,537 | 4/1974 | White . |
| 3,813,079 | 5/1974 | Baumann et al. . |
| 3,856,049 | 12/1974 | Scull . |
| 3,894,716 | 7/1975 | Barb . |
| 3,899,001 | 8/1975 | Orme . |
| 3,908,698 | 9/1975 | Baumann . |
| 3,917,221 | 11/1975 | Kubota et al. . |
| 3,921,668 | 11/1975 | Self . |
| 3,941,350 | 3/1976 | Kluczynski . |
| 3,954,124 | 5/1976 | Self . |
| 3,971,411 | 7/1976 | Baumann . |
| 3,978,891 | 9/1976 | Vick . |
| 3,995,664 | 12/1976 | Nelson . |
| 4,024,891 | 5/1977 | Engel et al. . |
| 4,060,099 | 11/1977 | Bates, Jr. . |

(List continued on next page.)

FOREIGN PATENT DOCUMENTS

| 515165 | 12/1952 | Australia . |
|---|---|---|
| 273597 | 1/1927 | United Kingdom . |

OTHER PUBLICATIONS

Article—"Coefficients and Factors Relating to the Aerodynamic Sound Level Generated by Throttling Valves", H.D. Baumann, *Noise Control Engineering Journal*, Jan. Feb. 1984, pp. 6–11.

*Primary Examiner*—John Fox
*Attorney, Agent, or Firm*—Marshall, O'Toole, Gerstein, Murray & Borun

[57] ABSTRACT

A fluid pressure reduction device with low noise generation. A stack of annular disks with fluid passageways formed of inlet slots, outlet slots, and interconnecting plenums. Selectively stacking and orienting the annular disks along with an asymmetric slot pattern creates the desired fluid passageways without creating an uninterrupted axial fluid flow path. High recovery inlet stages are in fluid communicating series with low recovery outlet stages and the combination provides a high performance fluid pressure reduction device with low noise generation.

17 Claims, 11 Drawing Sheets

U.S. PATENT DOCUMENTS

| | | |
|---|---|---|
| 4,068,683 | 1/1978 | Self . |
| 4,079,754 | 3/1978 | Porter . |
| 4,105,048 | 8/1978 | Self . |
| 4,125,129 | 11/1978 | Baumann . |
| 4,127,146 | 11/1978 | Self . |
| 4,221,037 | 9/1980 | Seger . |
| 4,249,574 | 2/1981 | Schnall et al. . |
| 4,258,750 | 3/1981 | Schnall et al. . |
| 4,267,045 | 5/1981 | Hoof . |
| 4,279,274 | 7/1981 | Seger . |
| 4,327,757 | 5/1982 | Weevers . |
| 4,352,373 | 10/1982 | Kay et al. . |
| 4,356,843 | 11/1982 | Baumann . |
| 4,398,563 | 8/1983 | Kay et al. . |
| 4,407,327 | 10/1983 | Hanson et al. . |
| 4,429,714 | 2/1984 | Hughes et al. . |
| 4,456,033 | 6/1984 | Kay et al. . |
| 4,473,210 | 9/1984 | Brighton . |
| 4,479,510 | 10/1984 | Bey . |
| 4,567,915 | 2/1986 | Bates et al. . |
| 4,617,963 | 10/1986 | Stares . |
| 4,665,946 | 5/1987 | Hulsey . |
| 4,671,321 | 6/1987 | Paetzel et al. . |
| 4,921,014 | 5/1990 | Tartaglia et al. . |
| 4,938,450 | 7/1990 | Tripp et al. . |
| 5,020,571 | 6/1991 | Tartaglia et al. ............... 137/625.3 |
| 5,390,896 | 2/1995 | Swirl ............................ 137/625.3 X |

FLUID PRESSURE REDUCTION DEVICE

This is a divisional of U.S. application Ser. No. 08/794,470, filed Feb. 4, 1997, now U.S. Pat. No. 5,769,122.

This invention relates to fluid energy dissipation devices and in particular to a fluid pressure reduction device with low acoustical conversion efficiency for gas flows and also for devices with anti-cavitation and hence low noise properties as designed for liquid flows.

BACKGROUND OF THE INVENTION

Considerations involving several factors regarding the present invention are discussed in separate labeled sections below. In particular, in connection with the fluid pressure reduction device of the present invention, the relevant considerations discussed separately below involve (A) Aerodynamic Noise; (B) Manufacturing; and (C) Hydrodynamic Noise.

(A) Aerodynamic Noise

In the control of fluid in industrial processes, such as oil and gas pipeline systems, chemical processes, etc., it is often necessary to reduce the pressure of a fluid. Adjustable flow restriction devices such as flow control valves and fluid regulators and other fixed fluid restriction devices such as diffusers, silencers, and other back pressure devices are utilized for this task. The purpose of the fluid control valve and/or other fluid restricting device in a given application may be to control flow rate or other process variables, but the restriction induces a pressure reduction inherently as a by-product of its flow control function.

Pressurized fluids contain stored mechanical potential energy. Reducing the pressure releases this energy. The energy manifests itself as the kinetic energy of the fluid—both the bulk motion of the fluid and its random turbulent motion. Turbulence is the chaotic motion of a fluid. However there is momentary structure in this random motion. Turbulent eddies (vortices) are formed, but rapidly break down into smaller eddies which in turn also breakdown, etc. Eventually viscosity damps out the motion of the smallest eddies and the energy has been transformed into heat.

This turbulent fluid motion has associated pressure and velocity fluctuations that act upon the structural elements of the piping system causing vibration. Vibration is undesirable because it can (if sufficiently strong) lead to fatigue failure of pressure retaining components or other types of wear, degradation of performance, or failure of attached instruments, etc. Even when not physically damaging, vibration generates air-borne noise that is annoying to or may damage the hearing of people.

There are three basic methods for noise control:

1.) Limit the amount of vibration generated initially. Since the amount of energy being dissipated is set by the application, this reduction in noise level must come from reducing the efficiency of fluid energy to acoustic energy conversion.
2.) Absorb the acoustic energy. A typical example of an industrial device is a fiber-glass packed silencer.
3.) Block the transmission of the sound. An example would be a thick-walled pipe.

The portion of the total amount of power that is converted into vibration depends on the nature of the flow field and the turbulence, in addition to the response or willingness of the surrounding structure to absorb that energy. The fraction of mechanical power converted to noise is known as the acoustical conversion efficiency.

There are several known methods to minimize the noise and vibration generated by reducing fluid pressure. In gases the four often-used methods are:

1.) Reduce the pressure in small steps or stages rather than by a single, turbulence generating process. Typically a pressure reducing stage is accomplished by a flow-stream contraction/expansion pair or by a direction change. In either case a higher velocity fluid jet is formed and is surrounded by a lower velocity region. The resultant turbulent mixing generates noise. If the pressure change across the stage is sufficiently high, the jet will "choke" or reach sonic velocity and shocks will form in the flow stream. A shock produces a sudden change in the flow's thermodynamic state. For example, the pressure may drop appreciably. When incoming turbulence passes through a shock, broadband shock-associated noise is also generated.
2.) Avoid the contact of high speed jets and turbulence onto solid surfaces. The so-called Reynolds stresses in free stream turbulence are a source of noise. However, when turbulence contacts a solid surface, acoustic dipole sources result. Dipole sources are fairly effective noise sources when the mean stream velocity is low.
3.) Subdivide the flow stream into small streams. This strategy actually accomplishes multiple desirable results. Due to their smaller characteristic dimensions, small streams create higher frequency turbulence because the initial eddies are smaller. The energy has been moved ahead in the eddy breakdown process, thus skipping opportunities for vibration generation. Secondly, these smaller eddies contain most of their energy in a frequency range that is less readily absorbed (and then radiated as noise) by piping components. Thus small streams improve the effectiveness of typical industrial piping to block the transmission of the noise that is generated. Thirdly, the human ear is less sensitive to high frequency noise, so an apparent noise reduction occurs. Fourth, it is easier to keep these small jets from impinging on a solid surface thus minimizing the dipole type noise. Finally, as long as jets from each stream remain isolated, the noise from each remains uncorrelated with the others and the total is minimized—similar to the effect of staging. Plugging of passages by fluid-borne debris establishes a practical lower limit for stream size.
4.) Combinations of the above strategies. One problem with staging for compressible flow is that as pressure is reduced, the volume of flow in subsequent stages is increased. For high pressure ratio (inlet pressure/outlet pressure) applications the increase in required flow area can be substantial. Many prior fluid restriction devices utilize passages with increasing flow area. For compressible flows these restrictors are normally used so that flow is radially outward through the annular cage wall. This takes advantage of the natural increase in gross cross-sectional area to provide space for increased passage area.

The main technical challenge of reducing the noise and vibration generated by reducing fluid pressure is the cost effective implementation of flow path geometry that manipulates the fluid state most effectively.

(B) Manufacturing

Forming the desired passageways in low-noise restricting elements is typically very expensive. The proper raw material form also affects cost and delivery. Annular castings or bar can be used to make the cylindrical structures in much of the currently available flow restrictors—sleeves, rings, etc. However, this requires many combinations of diameter, length, and thickness for the raw material. Annular disks of many ID/OD combinations can be cut from a common sheet and stacked to the desirable height. Wrought forms like sheet are less likely to contain defects, such as porosity, than are annular castings.

Historically, disks used in stacks to form a cage have been manufactured by chemical etching, milling, electron-discharge machining (EDM), casting, cutting, punching, or drilling. Chemical etching is a versatile process but is very expensive for parts of the size needed for valve cages. Furthermore, the acid bath and the dissolved metals in it presents a hazardous waste disposal problem. Milling is expensive and has limitations for small features due to a practical lower limit on the cutter size. Wire EDM is limited to through-cut designs and is slow. Plunge EDM can make recess-type designs but is better suited for pattern making, rather than mass-producing the disks. Casting is inexpensive but requires an expensive hardware pattern for each version of the design. Castings may require flattening and/or grinding operations prior to assembling the stack. Punching is limited to through-cut designs, requires a unique die for each punched shape, and the disks may not be flat after the stamping operation. Die wear can degrade the flow manipulating characteristics of the desired passage shape. Furthermore, small features may not be possible, especially for thick disks. Drilling limits passage shape to axisymmetric holes and tapers. Additionally, radii cannot be put on the inside of an annular cage structure by drilling.

Cutting methods include plasma, laser, and erosive water jet. Clearly these methods are limited to through-cut designs. However, many of the through-cut designs in prior flow restrictors do not lend themselves to cost effective production by cutting. For example, the skeletal disks shown in Self (U.S. Pat. No. 3,513,864) require a huge number of starts and stops of flame/beam/jet as the operation moves from one cutout region to the next. This starting and stopping adds substantial machine time per part, driving part cost proportionally higher. It is desired to provide a disk design that could be efficiently made with a cutting process.

Additionally, the widespread availability of computer numerical controlled (CNC) machines, computer aided design (CAD) systems, and automated interfaces in-between has dramatically shifted the relative cost advantage of software (CNC cutting) versus physical pattern-based manufacturing processes (casting). This software-based tooling is especially advantageous for severe service applications requiring noise control type restrictions that are often specially designed for the particular application.

Typically, disk stacks are held together by brazing or bolting. Sometimes disk to disk joints are individually welded.

In addition to the restrictor element cost, the size of the element for a given flow capacity influences the size of the valve body required which in turn greatly influences overall valve cost.

Traditional tortuous path trims have purposefully inefficient flow passageways to distribute the pressure reduction. Hence the flow rate per unit cross sectional area is less than for example a two-stage device. Consequently a traditional tortuous path based restrictor must be significantly larger to accommodate both the additional passage area and the extra stages per passage. This increase in restrictor size translates into a very large, heavy, expensive valve body requiring a large actuator to operate the valve.

(C) Hydrodynamic Noise

While the physical phenomena responsible for the generation of hydrodynamic noise in liquid pressure reduction is different, many of the fabrication techniques of this invention are also advantageous for use in liquid passageways. In industrial applications the chief source of noise and vibration from the pressure reduction of liquids is cavitation. Cavitation is caused in a flow stream when the fluid passes through a zone where the pressure is below its vapor pressure. Vapor bubbles form and then collapse after traveling downstream into a zone where pressure exceeds the vapor pressure. The collapse process may cause noise, vibration, and material attack.

One method to avoid these problems is to design a passageway in which the pressure never dips below vapor pressure. As with gas flows, multiple stages are often used. The number required depends on the amount of pressure reduction allocated to each stage and the minimum pressure in each stage as compared to its overall pressure change, i.e. the amount of pressure recovery. Low pressure recovery is desirable. Right angle turn-based stages often found in stacked plate flow restrictors exhibit pressure recovery. Consequently more turns are required; increasing the complexity, size and cost of the valve assembly.

As a matter of practicality, it is advantageous to take the largest pressure drop in the first stage (where static pressure is the highest) and progressively smaller pressure drops on subsequent stages. This approach is sometimes described as an increasing area flow path when applied to direction-change based stages.

As with compressible flows, small passage size is beneficial. Often it is permissible to operate under conditions that produce small amounts of cavitation. A group of small isolated two-phase jets is less efficient at exciting vibration than is a large two-phase jet.

As a theoretical principle, the control of velocity is an indirect means to control vibration and noise in liquids. The purpose of velocity control is to minimize the Bernoulli effect that reduces the local static pressure of a fluid due to its overall bulk motion. This relatively higher static pressure in turn minimizes the range of pressure conditions that cause cavitation.

It is therefore desired to provide a fluid pressure reduction device having low acoustical conversion efficiency or hydrodynamic noise, and which can be most efficiently manufactured to lower manufacturing costs.

SUMMARY OF THE INVENTION

In accordance with the principles of the present invention, there is provided a fluid pressure reduction device which includes at least two stacked disks each having fluid passageways for communicating fluid from an inlet to an outlet. For compressible fluids a high recovery first stage is provided in the fluid passageways, and a low recovery second stage is provided in series with the high recovery first stage. The high recovery and low recovery stages in series in the stacked disks are utilized to obtain the desired fluid pressure reduction with low aerodynamic noise generation. For liquids a construction with all stages of the low recovery type is preferred.

In another embodiment of a fluid pressure reduction device according to the invention, there is provided a plurality of stacked disks having hollow centers aligned along a longitudinal axis. Each disk in the stack has (a) fluid inlet stage slots partially extending from the disk center towards the disk perimeter, and (b) fluid outlet stage slots partially extending from the disk perimeter towards the disk center, and (c) at least one plenum slot extending within the disk. The disks are selectively positioned in the stack to enable fluid flow consecutively from the fluid inlet stage slots in one disk to the plenum slot in an adjacent second disk and to the fluid outlet stage slots in at least one disk, wherein the fluid flow path is split into two initial axial directions, and then distributed through multiple outlet stage slots of respective disks in the stack adjacent to the secondary disk.

In another embodiment of a fluid pressure reduction device according to the invention, there is a similar plurality of stacked disks with the plenum and slot patterns arranged in an alternating fashion around each disk. A plenum is provided for each group of inlet and outlet slots.

In another embodiment of a fluid pressure reduction device according to the invention, there is a plurality of stacked disk pairs in which the inlet and outlet slots previously described are all in one disk and the plenum(s) are all in the mating disk. This embodiment does not have the advantage of all the other embodiments of a smoothly varying flow resistance as the valve plug is stroked. Another disadvantage is that two different disks must be made rather than a single disk as will be described.

In another embodiment of a fluid pressure reduction device according to the invention, there is a seven stage construction, based on a plurality of stacked disks each having (a) fluid inlet slots partially extending from the disk center towards the disk perimeter, and (b) fluid outlet stage slots partially extending from the disk perimeter towards the disk center, and (c) at least one plenum slot extending within the disk. In this embodiment the slots have a shape that forms more than one (as compared to previous embodiments) fluid passage contraction/expansions per slot length. Again the disks are selectively positioned to enable fluid to flow from one stage to the next via the complimentary slot and plenum patterns of adjacent disks. Such complimentary patterns can be arranged in an alternating fashion within a single disk design. In such an embodiment with many stages, considerable overlapping slot area may exist permitting unimpeded axial flow through the stack. This may be undesirable especially for liquid applications, so a thin shim is added periodically in the stack sequence. It should be evident to those skilled in the art that embodiments with three to six stages (or more than seven) are deducible from the teachings of this invention.

In a preferred embodiment of the invention, a plurality of stacked annular disks having perimeters and with hollow centers is provided wherein each disk has the same complimentary pattern of slots grouped into clusters. Accordingly, each disk is identical with a plurality of fluid inlet stages each having slots partially extending from the disk center towards the disk perimeter. Each fluid inlet stage slot includes corner radii to prevent the flow from separating in passing through the stage and with tapered side passages to make each inlet stage a high recovery stage with resulting low noise generation. At the end of the tapered side passages there is provided a rear slot portion of limited size for communicating with upper and lower plenums in the respective adjacent upper and lower disks, as will be explained hereinafter.

Each disk further includes a plurality of fluid outlet stages located on the perimeter of the disk and on the same circumferential side as the inlet stages, with each outlet stage including slots partially extending from the disk perimeter towards the disk center. Each of the outlet stage slots has convergent side passages in order to make these downstream stages low recovery stages with resulting low noise generation. Each of the outlet stage slots further includes a forward slot portion for communication with upper and lower plenums in the respective adjacent upper and lower disks.

Each disk further includes plenum areas comprising slots located entirely within the disk on the opposite circumferential side of the disk from the inlet and outlet stage slots.

The disks are arranged in the stack in sets of four sub-stacks in which the second disk overlays the first disk with the inlet and outlet stages of the second disk overlaying the plenum portions in the first disk. The third disk in the sub-stack is in the same position as the first disk, except that the third disk is inverted horizontally. Thus the plenum portion of the third disk overlays the input and output stage portions of the second disk. Finally, the top or fourth disk in the sub-stack is positioned the same as the second disk except for being turned over. Accordingly, the top disk input and output stages overlay the plenum portions of the third disk.

Also, within each disk the inlet stage slots as well as the outlet stage slots are asymmetrical arranged within each disk. Accordingly, this asymmetrical disposition of the input and output slots along with the above disk stacking sequence enables a fluid communicating portion of the input and output slots to be aligned with the plenum area of a sandwiched disk, but prevents a direct uninterrupted axial flow path through the slots.

Thus, in the preferred embodiment, the fluid flow path into the hollow center portion of the stacked disks encounters multiple inlets each formed as a high recovery stage. Next, the fluid flow is split into an upper and a lower axial direction by passing through a rear slot portion at the end of the high recovery stage which rear slot portion is aligned with a respective plenum area in an immediately adjacent upper and lower disk. Each of the split flow paths now flow radially and is distributed circumferentially in the respective plenums and expand to reach the outlet stage slots providing a low recovery stage at the perimeter of an upper disk as well as a lower disk immediately adjacent each of the respective plenums containing the radial flow path. Now, in each of the plenums, the flow path extends axially upwardly as well as axially downwardly through a forward slot portion of the outlet slots which communicate with the adjacent plenums. The flow in each of the axial directions now combines in one or more of the outlet slots so that multiple radial outwardly flow directions are obtained through the multiple low recovery stages.

In the preferred embodiment for gas flows, it is desired that each of the high recovery inlet stages operate at a pressure ratio above about two in order to intentionally reduce noise generation. In addition, it is desired that the multiple low recovery outlet stages operate at a pressure ratio below about two in order to intentionally reduce noise generation. This provides a high performance gas pressure reduction device with low noise generation.

The embodiments just discussed are presented as devices with the fluid passing radially outward through the disk stack wall. It should be evident to those skilled in the art that the construction can be reversed from outlet stage to inlet stage, creating a device for flow passing radially inward.

A fluid pressure reduction device in accordance with the principles of the present invention includes the following structural features and operating characteristics and advantages:

1) Minimizes aerodynamic noise generation by constructing flow passage geometry that advantageously controls flow separation, shock formation, pressure recovery, and fluid turbulence characteristics.
2) For liquid flows, minimizes the propensity for cavitation by constructing flow passage geometry that controls flow separation and pressure recovery.
3) Implements this desirable flow passage geometry from a standard raw material form to reduce inventory and shorten delivery.

4) Implements this desirable flow passage geometry in a device that can be cost effectively manufactured by modern techniques—CNC controlled laser or water jet cutting, etc.
5) Minimizes overall valve cost by shrinking the size of the pressure reducing element as compared to tortuous path principle designs currently utilized.
6) Provides a fluid control valve with a smoothly varying resistance element with respect to plug position so as to improve control performance.
7) Provides a cost effective means to rigidly assemble a stack of disks during manufacture and use that also allows disassembly for repair or cleaning.
8) Provides a fluid control element which can be tailored to special applications without expensive tooling costs.

It is to be further noted that some conventional pressure reduction devices lead the fluid flow in a three dimensional tortuous flow path, such as a radial zig-zag, to exit the device at an outlet location level different from the inlet location level. In contrast devices of the present invention provide a three dimensional flow movement with the outlet location on the same level as the inlet.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
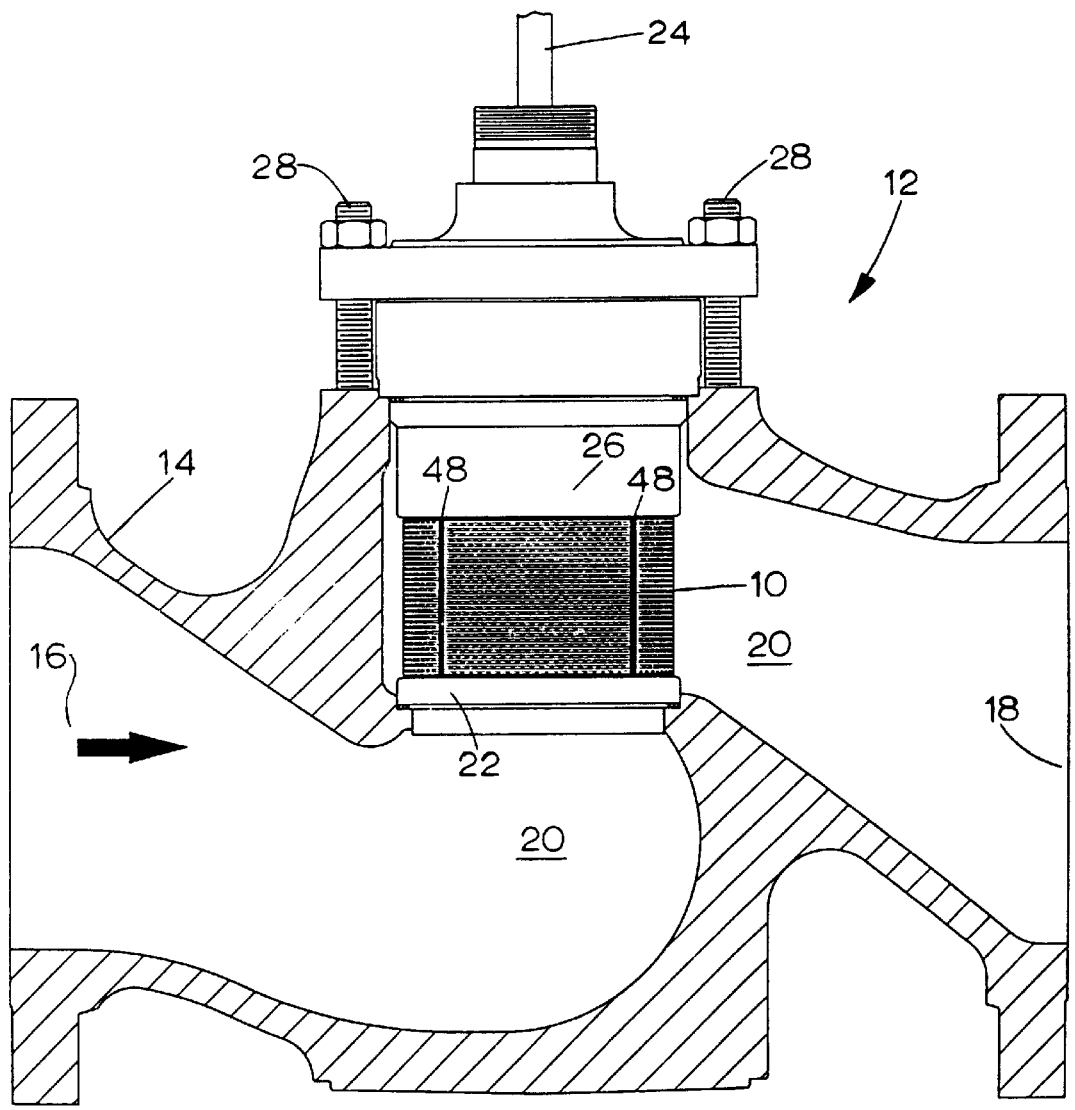
FIG. 1 is a cross-sectional view illustrating a fluid control valve containing a valve trim in the form of stacked disks forming a fluid pressure reduction device in accordance with the present invention.

Referring now to FIG. 1, there is illustrated a fluid pressure reduction device in accordance with the principles of the present invention in the form of a valve cage 10 having a plurality of stacked disks and mounted within a fluid control valve 12. Fluid control valve 12 includes a valve body 14 including a fluid inlet 16, a fluid outlet 18, and a connecting passageway 20 through the valve body.

A seat ring 22 is mounted within the valve body passageway 20 and cooperates with a valve operating member 24 to control fluid flow into the interior and through the exterior of the valve cage 10. The valve cage 10 may be maintained within the valve by conventional mounting means such as a cage retainer 26 and mounting bolts 28 engaging the valve bonnet portion of the valve in a known manner.

Figure 2:
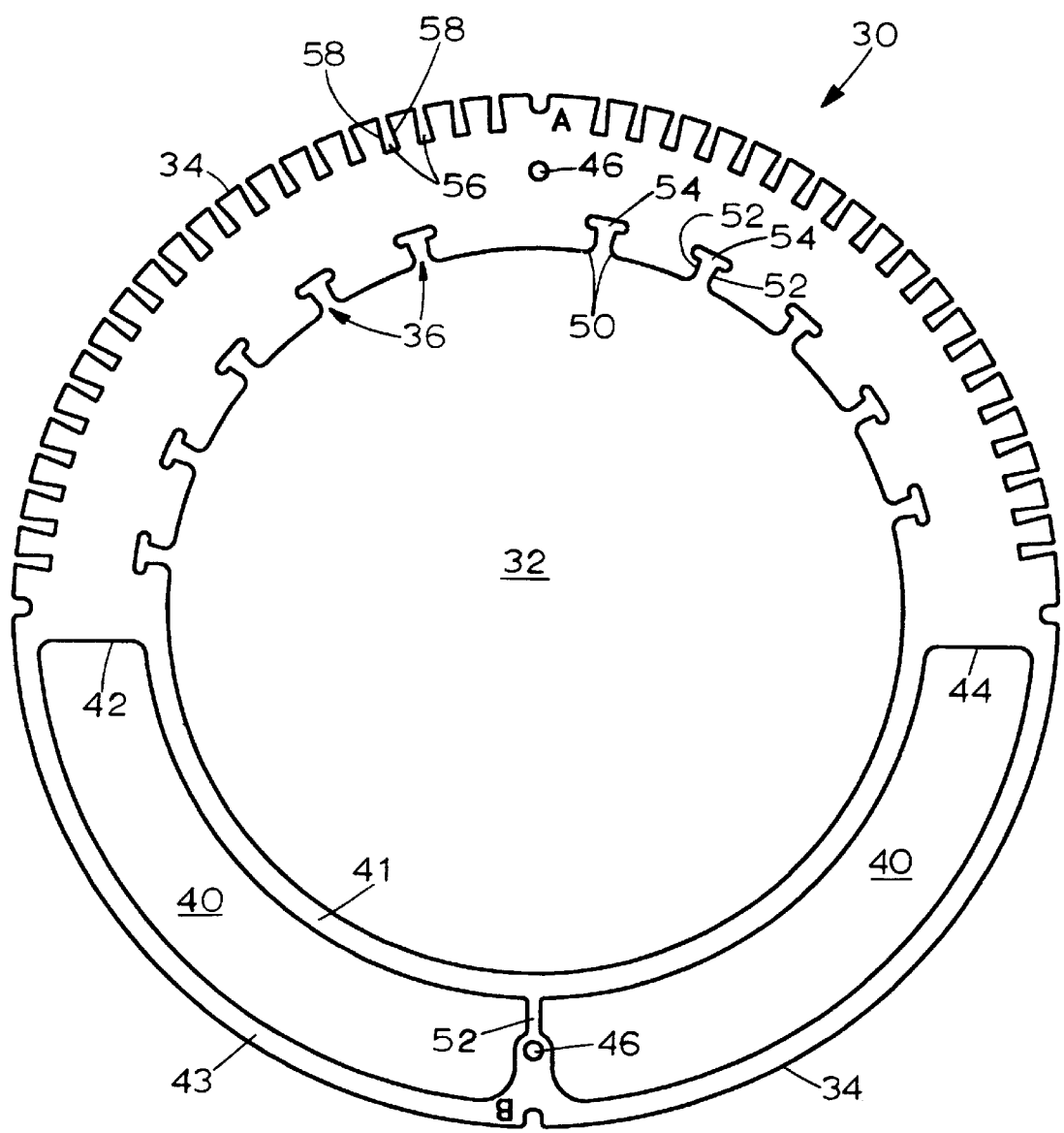
FIG. 2 is a plan view of an annular disk forming each of the stacked disks in FIG. 1.

The valve cage 10 includes a plurality of stacked disks, each of which is identical to a disk 30 as shown in FIG. 2. The disk 30 includes a hollow center portion 32 and an annular perimeter 34. On one side of the disk 30 there is provided a plurality of fluid inlet stage slots 36 each partially extending from the disk center 32 towards the disk perimeter 34, and a plurality of fluid outlet stage slots 38 each partially extending from the disk perimeter 34 towards the disk center 32.

On the circumferential side of the disk opposite to the fluid inlet and fluid outlet stage slots, there is provided one or more plenum slots 40 and which extend entirely within the disk from one end 42 adjacent one end of the fluid inlet and outlet slots to an opposite plenum end 44 adjacent the opposite end of the fluid inlet and outlet slots. The plenum 40 also extends between an inner disk portion 41 adjacent the hollow center portion 32 and an outer disk portion 43 which ends in the disk perimeter 34. A small support bridge 45 connects the disk portions 41, 43 and divides plenum 40 into two plenum sections.

As shown in FIG. 2, there is provided two opposite holes 46 on each disk. The holes 46 through each disk 30 accommodate a pair of orientation pins to orient each of the disks 30 within the stacked configuration. As can be seen in FIG. 2, passing of the orientation pins through the mounting holes 46 in each of the disks 30 is provided in a manner which does not interfere with the fluid flow through the valve cage 10. A series of weld beads 48, as shown in FIG. 1, on the outside of the valve cage 10 securely maintains the disks 30 in an assembled stack.

Each of the fluid inlet stage slots 36 is formed with corner radii 50 which tends to prevent the fluid flow from separating from the disk surface when passing through the first inlet stage. Also, tapered side passages 52 within each of the slots 36 provides a high recovery stage for each of the fluid inlet stages. As an example, the opposite side passages 52 are tapered to diverge radially outwardly at about a 15° included angle. At the end of each of the fluid inlet stage slots 36 there is provided a rear slot portion 54 of limited size and yet sufficient to communicate fluid into adjacent plenums 40 in adjacent upper and lower disks as will be described hereinafter.

Each of the fluid outlet stage slots 38 is formed with a forward slot portion 56 sufficient in size to communicate with a plenum 40 in adjacent upper and lower disks. Convergent side passageways 58 converge outwardly from the forward slot portion 56 towards the disk perimeter 34 to provide a low recovery stage for each of the fluid outlet stage slots 38. The high recovery inlet stages and the low recovery outlet stages are designed to provide low noise generation.

Reference may be made to the paper entitled *Coefficients and Factors relating to Aerodynamic Sound Level Generated by Throttling Valves*, by Hans D. Baumann in the 1984 January–February Noise Control Engineering Journal. The contents of this paper are expressly incorporated herein by reference to show the state of the art with respect to acoustical efficiency as a function of pressure recovery. According to this paper, it is recognized that the acoustical efficiency (in other words, noise-generating ability) will vary as a function of the degree of pressure recovery ($F_L$ factor) over a range of pressure ratios (for inlet and outlet valves). Streamline passages have low $F_L$ factors and an abrupt discharge area has a high $F_L$ factor that can be close to 1.0. By providing a small cross section at the inlet and a tapered flow path toward the outlet, a low $F_L$ is provided. Such a low $F_L$ is advantageous for high pressure ratios across the stage that are above 2:1 since this generates a lower acoustical efficiency, typically 5–10 dB over that of a high $F_L$ passage. However, when the pressure ratio is low (below 2:1), a high $F_L$ is preferred for lower acoustical efficiency, typically 5–10 dB lower. Hence, a range of slot sizes and configurations can be employed to custom-fit a low noise outlet section to the given pressure conditions of the valve in its normal operating range.

In the preferred embodiment of the invention, it is desired that each of the high recovery inlet stages 36 operates at a pressure ratio above about two in order to intentionally reduce noise generation. In addition, it is desired that each of the multiple low recovery outlet stages 38 operates at a pressure ratio below about two in order to intentionally reduce noise generation. This enables the valve cage 10 to provide a high performance fluid pressure reduction with low noise generation.

Referring now to FIG. 2, it may be noted that there is a reference character A at one side of the disk 30 and a reference character B at the opposite side of disk 30. These reference characters A, B will be useful in understanding the orientation of the disks 30 within the stacked disk assembly in accordance with the invention. Also, it can be seen from FIG. 2 that the fluid inlet stage slots 36 are not symmetrically arranged on the disk with respect to the plenum 40. In particular, note that the last fluid inlet stage slot 36 on the left-hand side of FIG. 2 adjacent to plenum end 42 is much closer to plenum end 42 than the opposite, right-hand, last fluid inlet stage slot 36 is with respect to the opposite plenum end 44. The same asymmetric configuration may be noted with respect to the fluid outlet stage slots 38 and the plenum ends 42, 44. This is an important feature of the present invention so as to ensure that when the disks 30 are assembled in the stacked disk assembly in the selective manner shown in FIG. 3, there will not be any direct, uninterrupted axial fluid flow through the slots. Accordingly, substantially all of the fluid flow will extend from the fluid inlet stage slots 36 through the plenum 40 and eventually out the fluid outlet stage slots 38.

Figure 3:
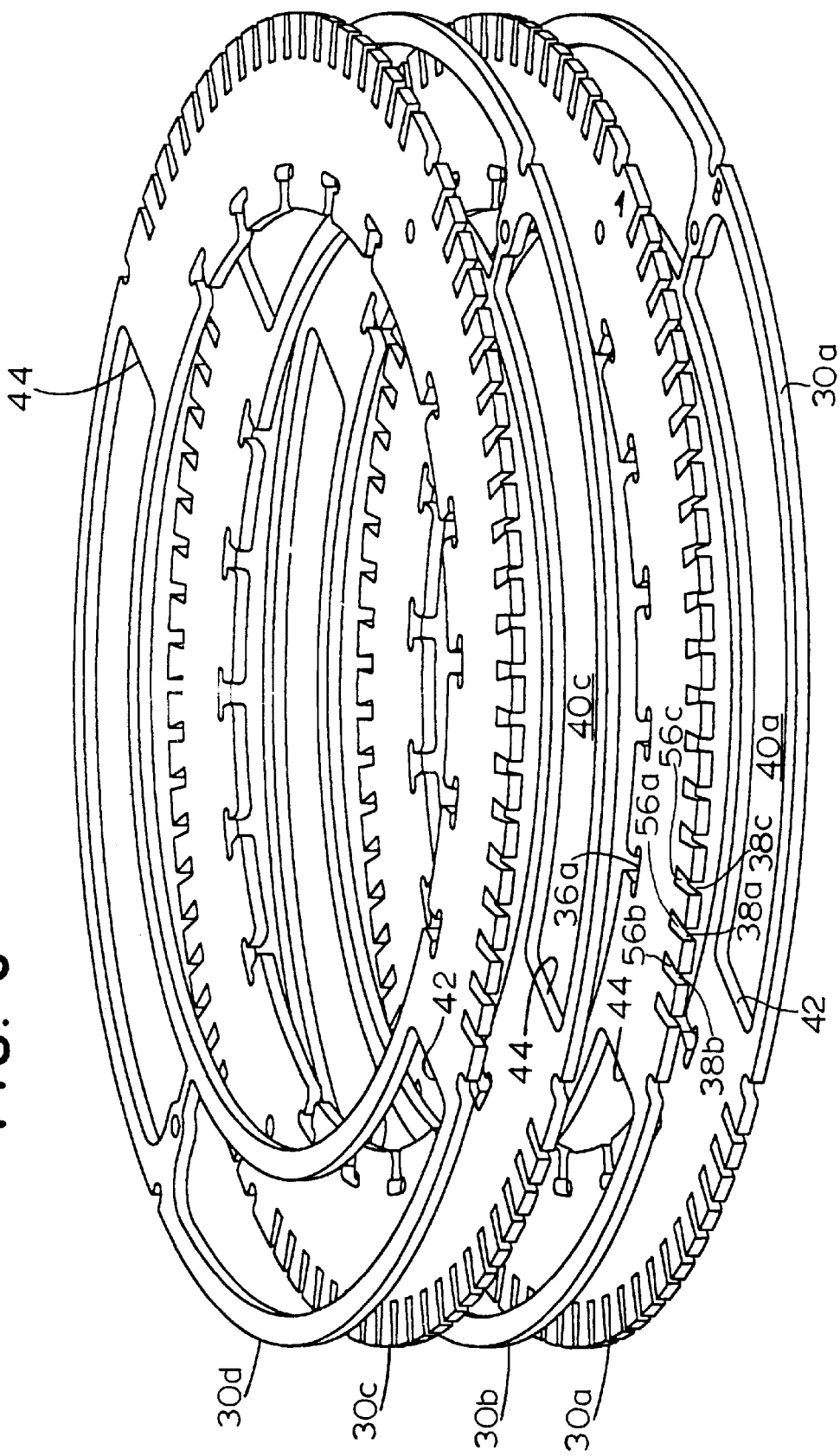
FIG. 3 is a perspective view of four disks as in FIG. 2 selectively positioned in a four-disk sub-set in accordance with the invention.

Referring now to FIG. 3, there is shown a sub-set of four identical disks 30 in an exploded view so that the relationship and selective positioning of each disk can more readily be described and illustrated. It is to be understood that the valve cage 10 contains stacked disks which includes groups or sub-sets of four disks 30 such as shown in FIG. 3 stacked one above the other.

In FIG. 3, the lowermost disk 30a can be seen to be in the same position as the disk 30 shown in FIG. 2 with the reference character B visible on the top disk surface. The next disk 30b is positioned by rotating the disk 180° so that the reference character A is visible above the reference character B of the lower disk 30a. The next disk 30c is positioned by taking the disk 30 of FIG. 2 and turning it over so that the reference character B is no longer visible and is positioned above the visible reference character A of the lower disk 30b. Finally, the topmost disk 30d is positioned by turning over the disk 30 of FIG. 2 so that the reference character A is no longer visible and is substantially in line with the invisible reference character B of disk 30c, the visible reference character A of disk 30b and the visible reference character B of the lowermost disk 30a.

As indicated previously, the fluid inlet stage slots 36 and the fluid outlet stage slots 38 are asymmetrically configured on the disk with respect to the orientation pin holes 46, and specifically with respect to the plenum ends 42, 44. This asymmetric configuration of the slots 36, 38 along with the selective positioning of the disks 30a–d as shown in FIG. 3, prevents an uninterrupted axial flow path to exist in the stacked disk assembly. Additionally, this feature prevents the excitation of an acoustic column resonance that could occur with an unobstructed axial chamber.

Figure 4:
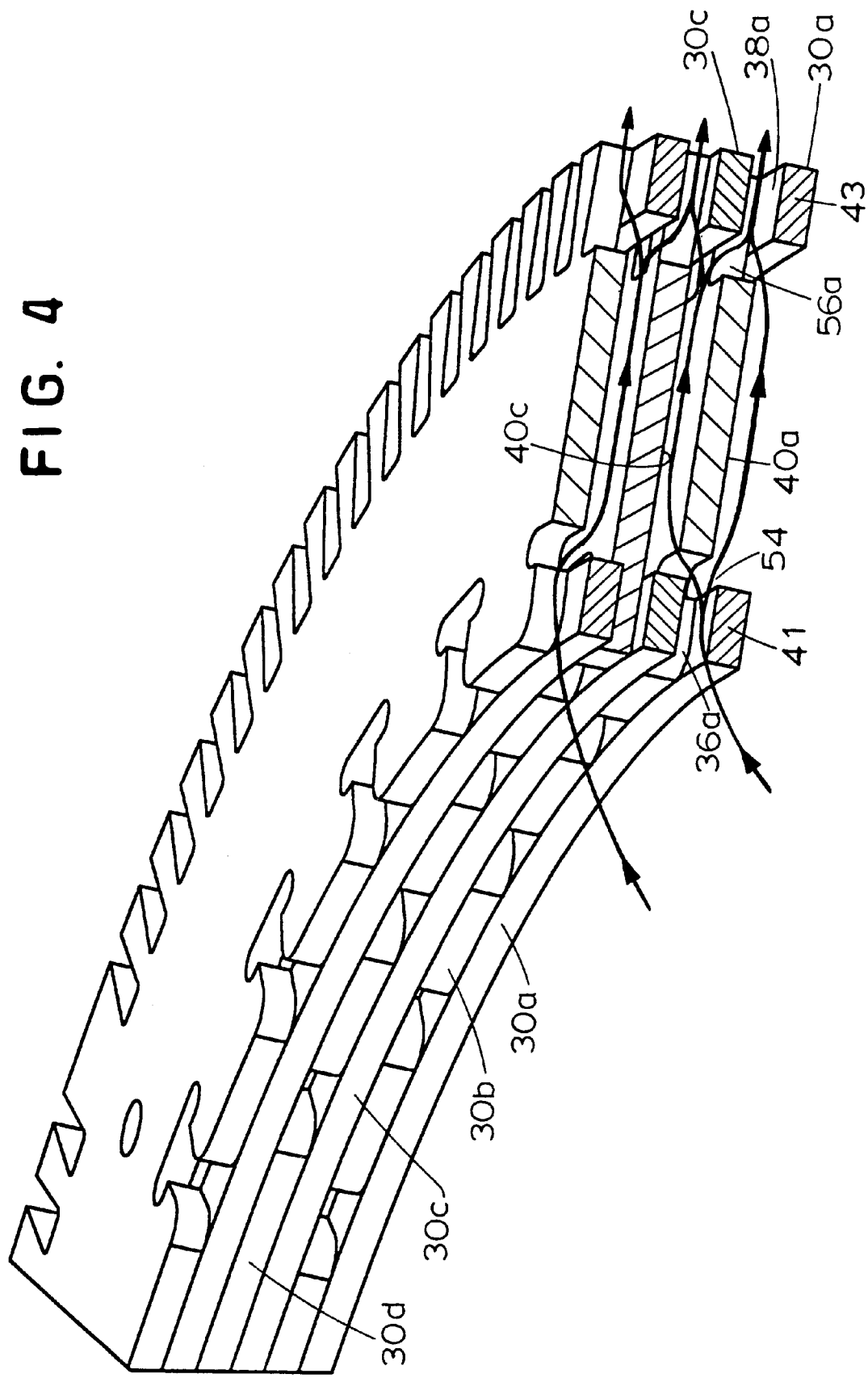
FIG. 4 is a fragmented perspective view illustrating the stacked disks of FIG. 1 with a schematic representation of the fluid flow path therethrough.
Figure 5:
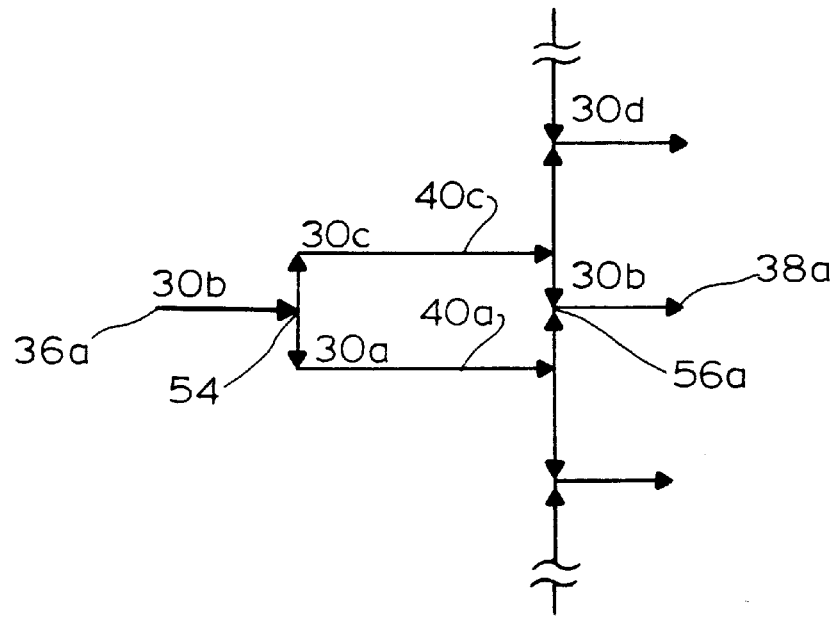
FIG. 5 is a schematic flow diagram illustrating the flow path through the stacked disks as viewed in a side view.
Figure 6:
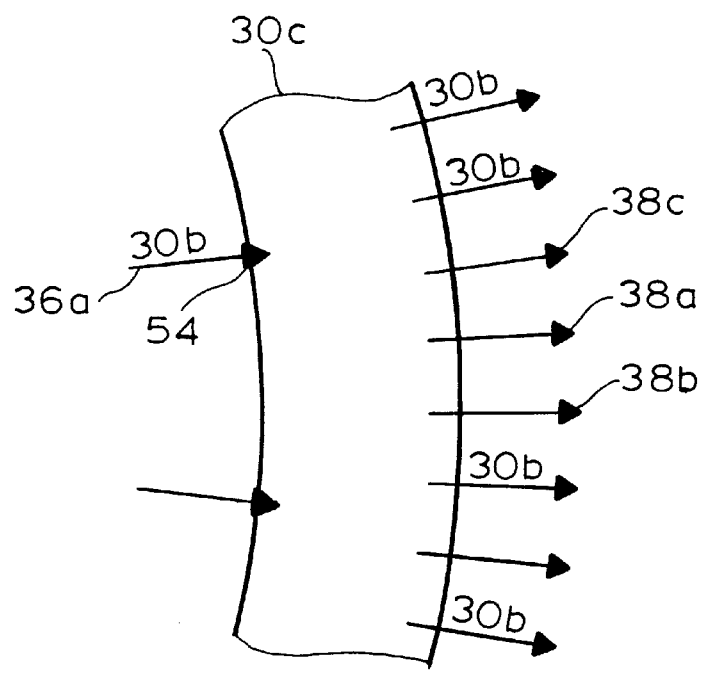
FIG. 6 is a schematic flow diagram illustrating the fluid flow path through the stacked disks in a plan view.

Referring now to FIGS. 4, 5 and 6, there is illustrated the manner in which the fluid flow path extends as a three dimensional flow movement through the valve cage 10. For convenience in a description of the flow path, the lowermost disk 30a and the succeeding upper disks 30b, 30c and 30d are similarly referenced in FIGS. 3 and 4, as well as in FIGS. 5 and 6 to the extent possible in view of the schematic nature of FIGS. 5 and 6. Initially, the fluid flow at the hollow center portion 32 enters each of the fluid inlet stage slots 36. For convenience in illustration and description, the three dimensional flow path through one of the fluid inlet stage slots 36 to multiple outlet stages 38 will be described. Particularly note that although a three dimensional flow movement is provided through the stacked disks, the outlet is still conveniently on the same level as the inlet.

As an example, fluid enters fluid inlet stage slot 36a in disk 30b. The fluid flow proceeds between the tapered passages 52 and to the rear slot portion 54 to extend axially upwardly as well as axially downwardly through the rear slot portion 54 and into the plenums 40 of the lower disk 30a as well as the upper disk 30c. After being split into two initial axial directions, the fluid flow now extends into multiple radial flow directions within the plenum 40a of disk 30a as well as in the plenum 40c of the disk 30c.

Next, the fluid flow encounters a plurality of respective forward slot portions 56 of respective outlet stage slots 38. As one example, each of the fluid flow paths in plenums 40a and 40c encounter forward slot portion 56a so that the flow streams flow respectively axially upwardly and axially downwardly through the forward slot portion 56a and out the respective fluid outlet stage slot 38a of disk 30b. It is to be understood that this is only one example of the fluid flow from the plenums passing through an outlet slot. In reality, the fluid flow in the plenums 40a and 40c are distributed circumferentially through multiple radial outlet stage slots 38.

For example, referring to FIG. 5, note the initial fluid inlet into disk 30b is first split into two initial axial directions to reach lower disk 30a and the upper disk 30c and thereafter extend in multiple radial flow directions within the respective plenums 40a and 40c. At the outlet stages, for example, the flow within plenum 40c extends axially downwardly through several forward slot portions 56 of respective outlet stage slot 38 (see FIG. 6) in the lower disk 30b, as well as extending axially upwardly through another plurality of forward slot portions 56 of respective outlet stage slots 38 in the upper disk 30d. Note that the multiple radial flow direction within plenum 40a also is split into an upper disk 30b as well as a lower disk (unmarked in FIG. 5).

FIG. 6 illustrates that within each of the respective disks 30d, 30b, and the unmarked disk of FIG. 5 that the flow is distributed circumferentially through and finally out multiple radial outlet slots 38. For example, from plenum 40c, the flow is distributed circumferentially through many forward slot portions (such as 56a, b, c, etc.) to multiple outlets in disk 30b, such as 38a, b, c, etc. Accordingly, because of the large plenums feeding many outlet slots provided in the valve cage 10, in accordance with this invention, any plugging or blocking of one or a few of the outlet stage slots does not significantly alter the performance of this device. This is a significant advantage over prior conventional devices using a tortuous flow path where a blockage in any single passage of the path can completely stop the flow. Also, it may be noted that the preferred embodiment has a smooth linear characteristic because each disk 30 has both inlets and outlets, and there are no "dead spots" such as in prior tortuous flow path devices. Other desirable non-linear flow versus travel characteristics could be attained by varying the number of inlets and outlets in some of the disks.

As can be seen from the embodiment of FIG. 2, the complementary slot patterns are grouped into two clusters rather than dispersed in an alternating fashion around the circumference of the disk. Also, plenum chambers of equal pressure can be consolidated into a single large chamber which eliminates many starts and stops of a cutting flame/beam/jet during manufacture. This also substantially reduces the perimeter (cut length). As can be seen, grouping complementary slot patterns into clusters leads to a single disk design 30 for the complete valve cage 10. A complete flow path is determined by the proper sequencing of disk orientations. Two or more clusters on a single disk can be used. A two cluster disk such as in FIG. 2 leads to a four-layer cage sub-set as shown in FIG. 3, while a three cluster disk leads to a six-layer cage sub-set. Advantageous fluid design features of the slot passageways reduces the number of stages necessary for a given attenuation, thus minimizing element size and complexity.

Figure 7:
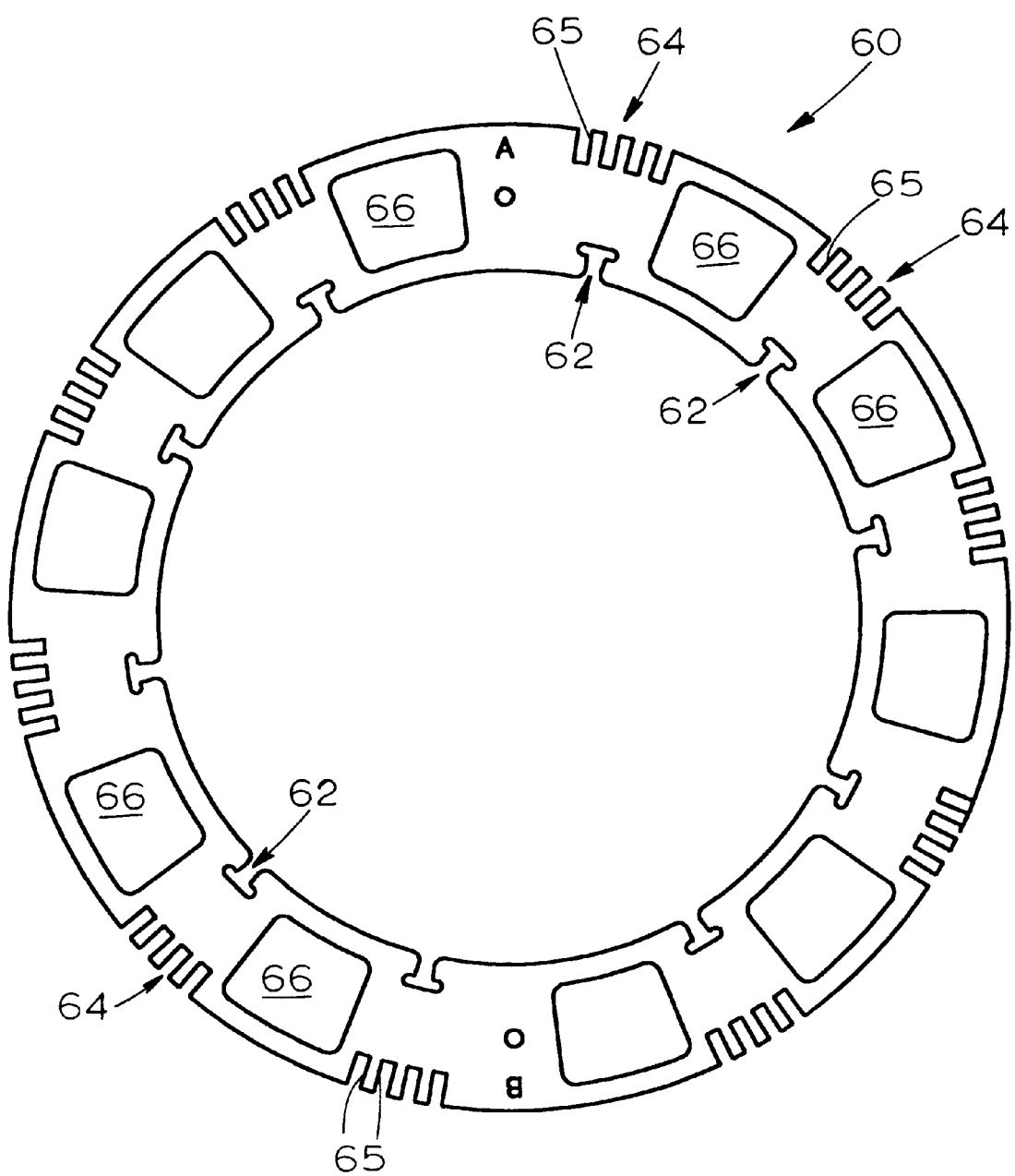
FIG. 7 is a plan view of another disk embodiment with alternating slots and plenums.

Referring to FIG. 2, it may be noted that the disk 30 contains all of the slots 36, 38 on one-half of the disk and the plenums 40 on the other half. An alternative disk 60 shown in FIG. 7 contains alternate groups of slots, i.e., inlet slots 62 and outlet slots 64, and plenums 66 around the entire disk circumference. A plenum 66 is provided for each group of inlet and outlet slots. Using the disk 60 with the alternating slots and plenum pattern shown in FIG. 7, requires a cage sub-set of two disks 60 in a stacked sequence such that there is provided a three dimensional flow movement and with the fluid outlet still being provided on the same level as the fluid inlet. However, in the embodiment of FIG. 7 it is difficult to efficiently implement the asymmetrical slot pattern that blocks uninterrupted axial flow. The advantage of the slot and plenum configuration of FIG. 7 is that it offers substantially more rigidity than a configuration having longer plenum chambers as in FIGS. 2 and 8. The allowable pressure drop is therefore increased.

Furthermore, as can be seen in FIG. 7, each of the fluid outlet stages 64 has straight sides 65 in the slots rather than the slanted sides 58 of disk 30. The straight sided slots in the outlet stage 64 are not as efficient as the slanted sides in providing low acoustical conversion efficiency for the device. However, the straight sides are easier to construct with conventional cutting techniques than the slanted sides. It is understood, of course that instead of the straight sided slots the slanted sided slots such as in disk 30 can be utilized in order to provide a more efficient low recovery stage for the fluid outlet stage 64 if desired.

Figure 8A:
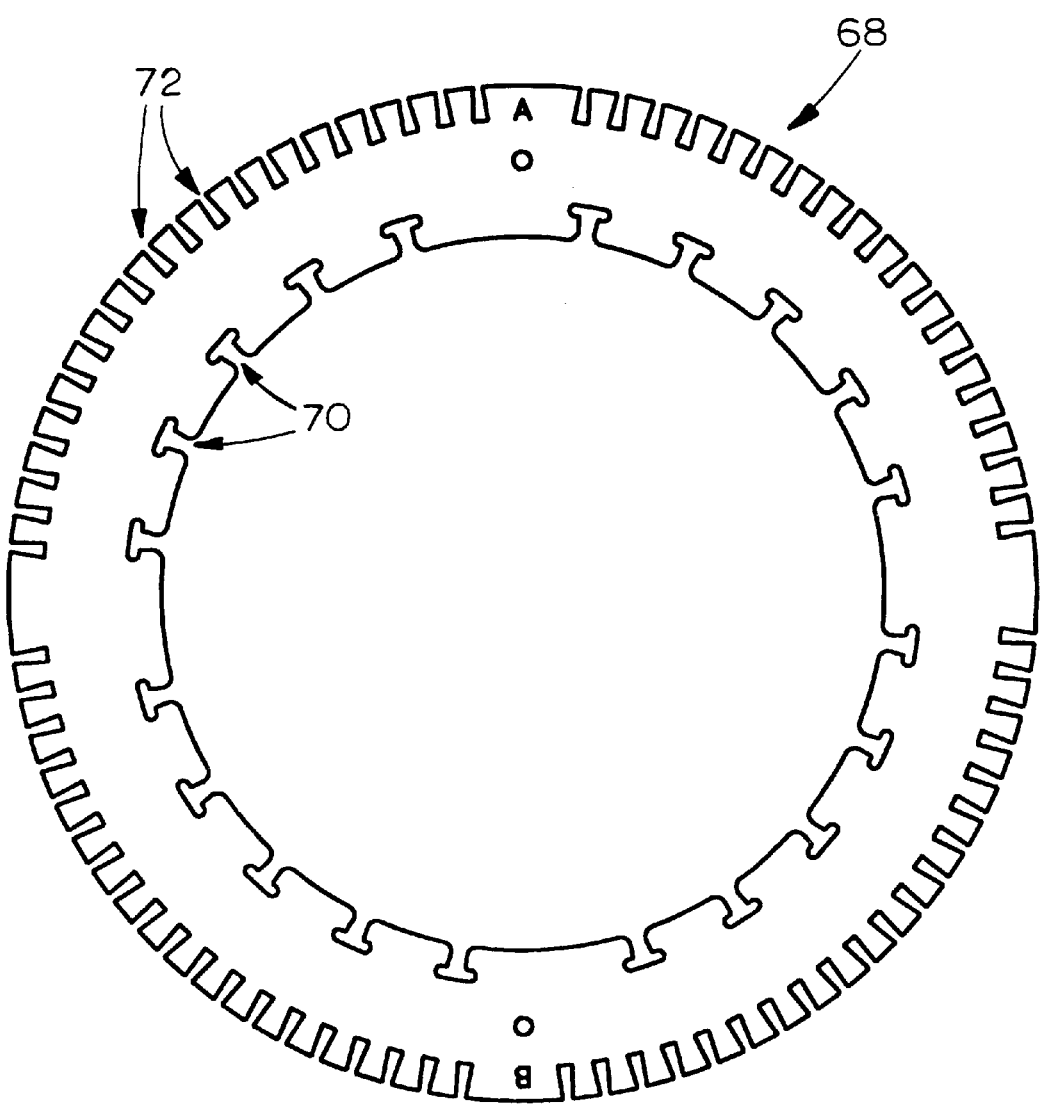
FIGS. 8(A) and 8(B) are respective plan views of still another disk embodiment with all slots in one disk and all plenums in the other disk.
Figure 8B:
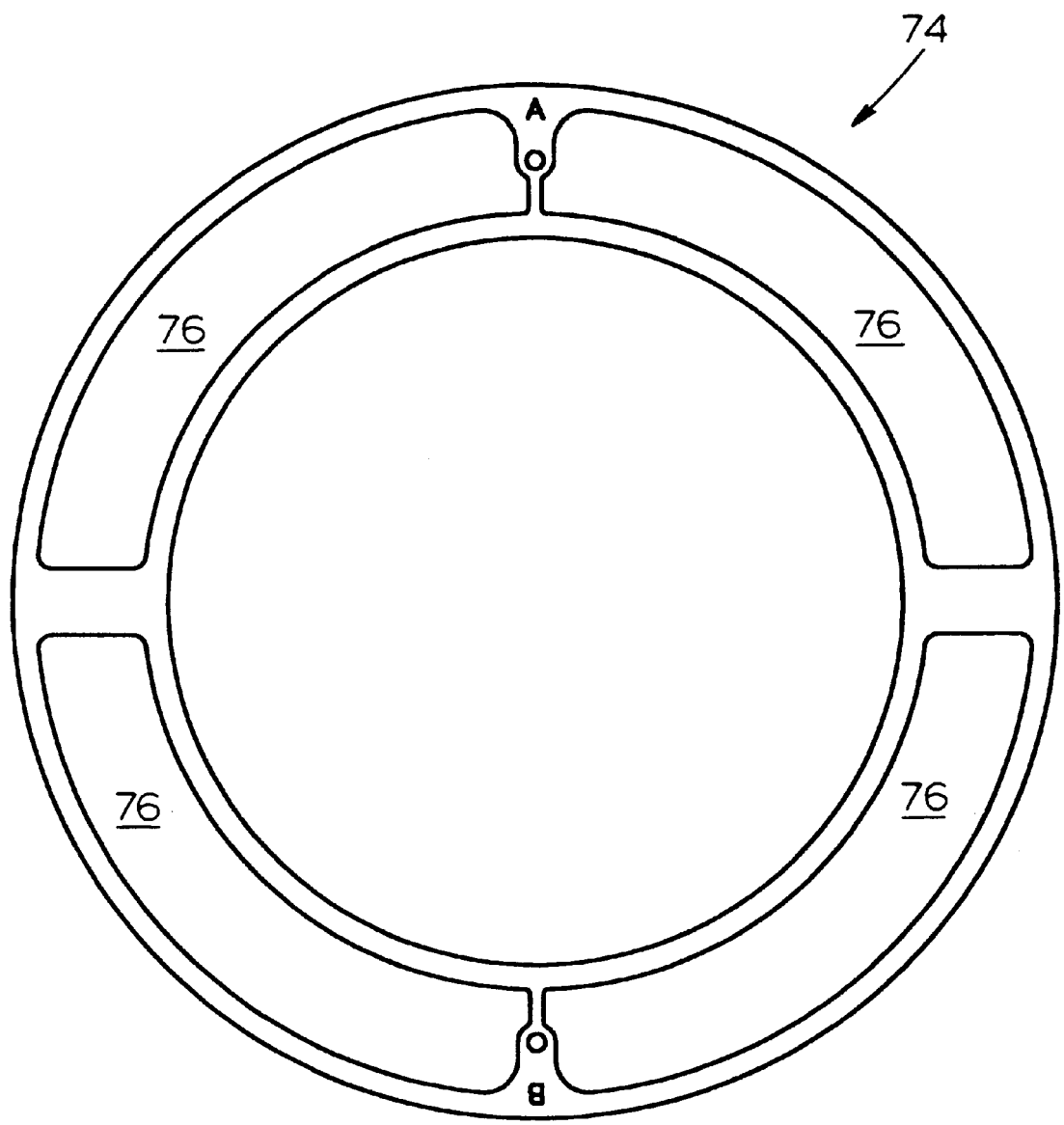

FIGS. 8(A) and 8(B) show another alternative configuration of a disk pattern. In FIG. 8(A) the disk 68 contains all fluid inlet slots 70 and fluid outlet slots 72 located around the circumference of disk 68 in a four cluster pattern (i.e. four respective groups of inlet and outlet slots). With reference to FIG. 8(B) it can be seen that the companion disk 74 has four plenums 76 located around the circumference of the disk. Using disks 68 and 74 requires a cage sub-set of four disks to provide a three-dimensional flow movement with the output of the fluid being on the same level as the inlet and the interruptions to axial flow as in the prior described embodiments of the invention.

The embodiment of FIGS. 8(A) and (B) requires two different disks to be made and stacked instead of the single disk of the other embodiments. Also, this embodiment does not provide a smoothly varying flow resistance as the valve plug is stroked in contrast to the other embodiments which have a smooth linear characteristic.

It may be noted that the slot pattern can be varied on sequential disks to change the pressure drop through the device and the flow capacity if desired. For instance less inlet slots can be provided on one or more disks compared to the following disks in the flow sequence. The advantage of a single required disk or two required disks may be lost, however, the ability to vary the valve flow characteristic (flow versus travel) may be more desirable.

Figure 9:
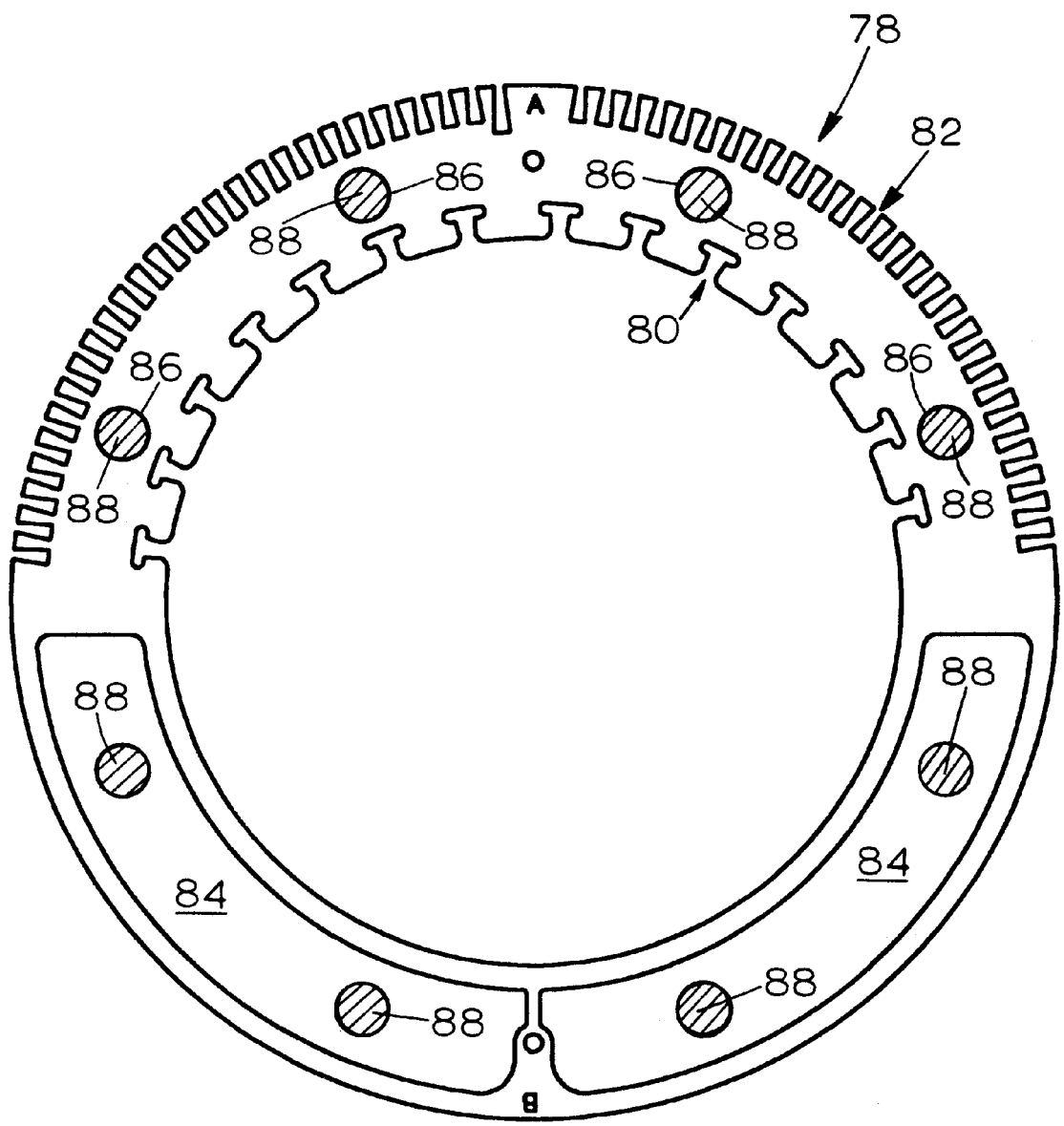
FIG. 9 is a plan view of a further disk embodiment with bolts to maintain the disks in a stacked configuration.

FIG. 9 shows an alternative disk 78 having fluid inlet stage slots 80, fluid outlet stage slots 82 nd plenums 84, and further includes four apertures 86. The apertures 86 are adapted to accommodate a respective bolt 88 which can be inserted through each of the apertures 86 in each of the disks 78 of a stacked disk configuration for maintaining the stacked disk bolted together. Using a bolted assembly eliminates the need for the weld beads 48 of FIG. 1. It may be noted that the series of bolts 88 do not proportionally reduce the flow capacity of the stacked disk assembly because of the common plenum location of the present invention.

In each of the previously described embodiments of the invention there has been utilized a two-stage design wherein the fluid passes through an inlet stage, and is coupled through a plenum to an outlet stage. Alternatively, multiple pressure reduction stages can be provided where this is desirable.

Figure 10:
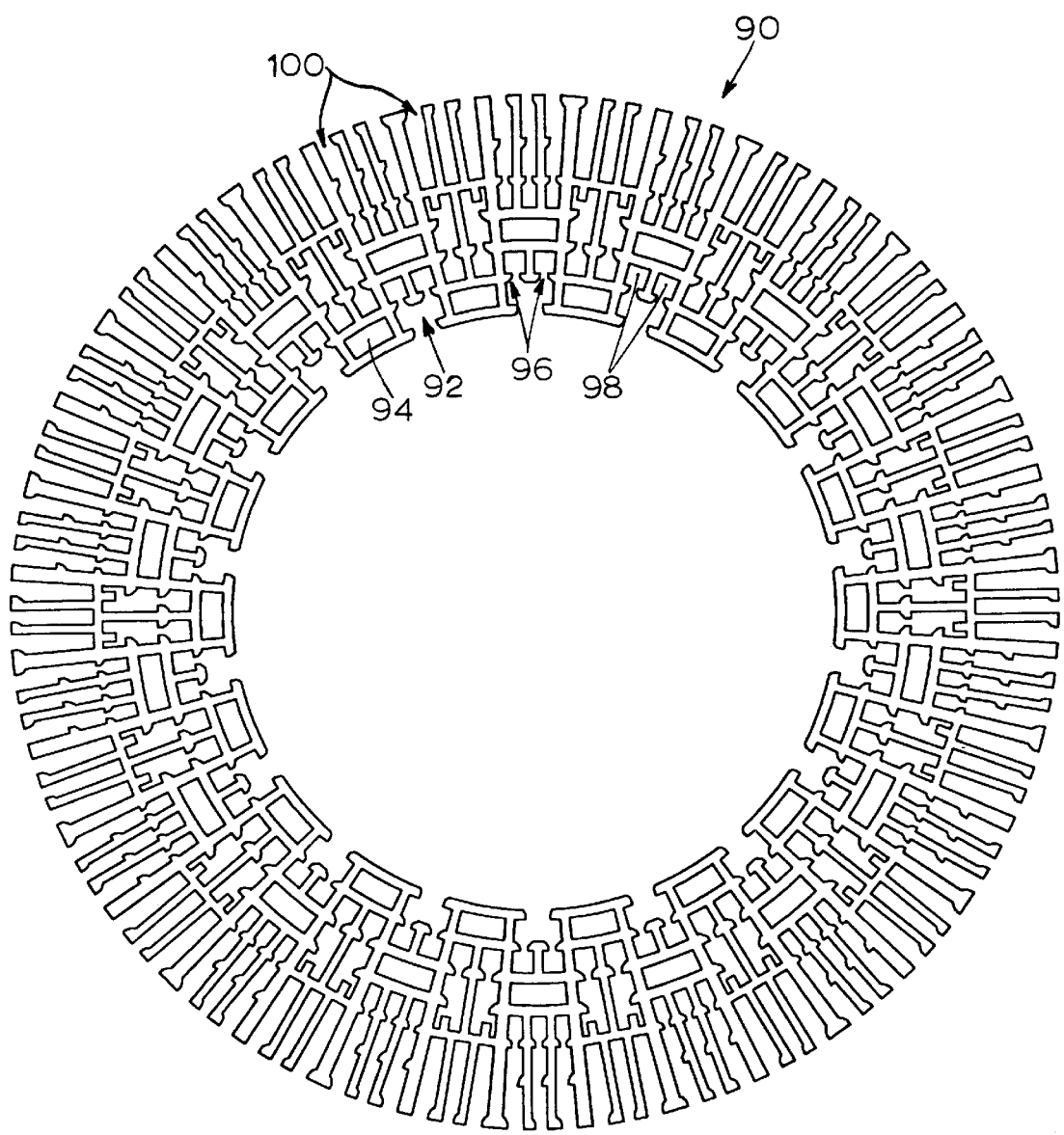
FIG. 10 is a plan view of a still further disk embodiment with multiple fluid processing stages.
Figure 11:
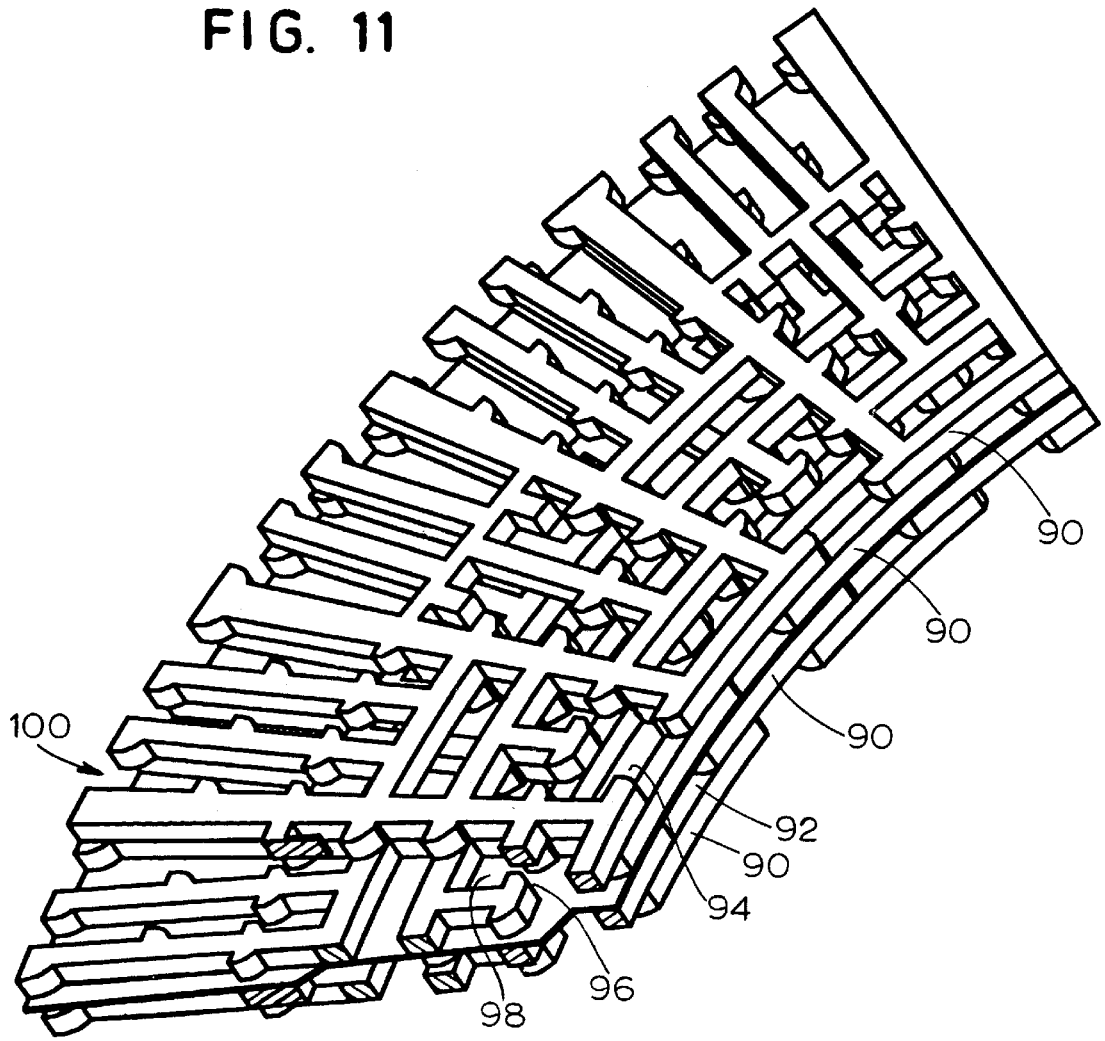
FIG. 11 is a perspective view of a fragmented portion of four disks each as in FIG. 10 selectively positioned in a four-disk sub-set in a multiple stage embodiment of the invention.

One example of a multiple stage pattern in accordance with the present invention is shown in the plan view of FIG. 10 showing a disk 90 with seven stages and the perspective view of FIG. 11 showing a cage sub-set of four disks 90. With reference to FIG. 10, the disk 90 includes a series of first stage inlet slots 92, plenums 94, second stage slots 96, plenums 98, etc. leading to the final seventh outlet stage slots 100. As seen from FIG. 10, the slots 92, 96, 100 have a shape that forms more than one fluid passage contraction/expansion per slot length.

Reference may be made to FIG. 11 wherein the perspective view shows the coupling of fluid from the inlet slot 92 through the three dimensional flow through the four sub-set of disks 90 to finally exit at outlet stage 100 at the same level as the inlet stage 92. It is understood, of course that the flow of fluid through the seven stages incorporated in the stacked disk configuration shown in FIG. 11 is the same as the flow through the two-stage configuration described previously, i.e., from one stage to the next via the complimentary slot and plenum patterns of adjacent disks.

This seven stage embodiment is particularly useful for liquid flow applications. However, due to the multiple stages, considerable overlapping slot area may exist permitting an undesired, unimpeded axial flow through the stack, so a thin shim may be added periodically in the stack sequence to avoid this problem. In accordance with the teachings herein, alternative embodiments with three to six stages (and more than seven) may be provided by those skilled in the art.

While the present description is directed to including the fluid pressure reducing device of this invention in a throttling fluid control valve, it is understood the invention is not so limited. The device may be implemented as a fixed restriction in a pipeline either upstream or downstream of a control valve, or entirely independent of the location of a control valve.

The foregoing detailed description has been given for clearness of understanding only, and no unnecessary limitations should be understood therefrom, as modifications will be obvious to those skilled in the art.

What is claimed is:

1. A fluid pressure reduction device comprising:
   at least two stacked disks each having fluid passageways for communicating fluid from an inlet to an outlet;
   a high recovery first stage in said fluid passageways; and
   a low recovery second stage in series with said high recovery first stage to obtain the desired fluid pressure reduction with low noise generation.

2. A fluid pressure reduction device according to claim 1, including a plenum within said fluid passageways fluidly connecting said high recovery first stage with said low recovery second stage.

3. A fluid pressure reduction device comprising:
   a plurality of stacked annular disks having a perimeter and hollow centers aligned along a longitudinal axis;
   each disk including multiple high recovery first stages located at said hollow center for receiving fluid inlet and multiple low recovery second stages in fluid communicating series with said high recovery first stages and located at said perimeter;
   said high recovery first stage and series coupled low recovery second stages providing the desired fluid pressure reduction with low noise generation.

4. A fluid pressure reduction device according to claim 3, wherein each disk further includes a plenum fluidly connecting a high recovery first stage of an adjacent disk in said stack with at least a low recovery second stage of said adjacent disk.

5. A fluid pressure reduction device according to claim 4, wherein said plenum in one disk also fluidly connects a high recovery first stage of an adjacent disk in said stack with a plurality of low recovery second stages in respective disks in said stack adjacent to said one disk.

6. A fluid pressure reduction device according to claim 5, wherein each of said multiple high recovery stages are radially aligned around a portion of said disk hollow center, and each of said multiple low recovery stages are radially aligned around a portion of said disk perimeter.

7. A fluid pressure reduction device according to claim 6, wherein said multiple high recovery stages and said multiple low recovery stages are located on the same circumferential side of each disk.

8. A fluid pressure reduction device according to claim 7, wherein said plenum is disposed on the opposite circumferential side of each disk from said multiple high recovery stages and said multiple low recovery stages.

9. A fluid pressure reduction device according to claim 8, wherein said multiple high recovery stages and said multiple low recovery stages are asymmetrically located on each disk with respect to said plenum to prevent an uninterrupted axial fluid flow path through said stacked disks.

10. A fluid pressure reduction device according to claim 5, wherein said plenum, said multiple high recovery first stages, and said multiple low recovery second stages are selectively positioned to minimize any uninterrupted axial fluid flow through said stack.

11. A fluid pressure reduction device according to claim 10, wherein said multiple low recovery second stages comprise fluid outlet stage slots, each including a forward slot portion fluidly communicating with said plenum in respective adjacent disks in said stack.

12. A fluid pressure reduction device according to claim 3, each disk including a plenum, and
   said disks selectively positioned in said stack to enable said high recovery first stages and low recovery second stages in one disk to fluidly communicate with said plenums in adjacent disks, wherein the fluid flow path is split into two initial axial directions, then into said plenums with multiple radial flow directions, and then distributed through said multiple low recovery second stages.

13. A fluid pressure reduction device according to claim 12, wherein said plenum in one disk fluidly communicates with only a portion of said high recovery first stage and of said low recovery second stage in respectively adjacent disks, to minimize any uninterrupted axial fluid flow through said stack.

14. A fluid control valve comprising:
   a valve body including a fluid inlet, a fluid outlet, and a connecting valve body passageway;
   a valve seat mounted in said valve body passageway;
   an operating valve member adapted to cooperate with said valve seat to control the flow of fluid through said valve body passageway;
   a valve cage mounted above said valve seat and in said valve body passageway for reducing the fluid pressure, said valve cage including;
      a plurality of stacked annular disks having a perimeter and hollow centers aligned along a longitudinal axis;
      each disk including multiple high recovery first stages located at said hollow center for receiving fluid inlet and multiple low recovery second stages in fluid communicating series with said high recovery first stages and located at said perimeter;
      said high recovery first stage and series coupled low recovery second stages providing the desired fluid pressure reduction with low noise generation.

15. A fluid control valve according to claim 14, each disk including a plenum, and
   said disks selectively positioned in said stack to enable said high recovery first stages and low recovery second stages in one disk to fluidly communicate with said plenums in adjacent disks, wherein the fluid flow path is split into two initial axial directions, then into said plenums with multiple radial flow directions, and then distributed through said multiple low recovery second stages.

16. A fluid control valve according to claim 15, wherein said multiple low recovery second stages comprise fluid outlet stage slots, each including a forward slot portion fluidly communicating with said plenum in respective adjacent disks in said stack.

17. A fluid pressure reduction device comprising:
   a plurality of stacked disks having a perimeter and hollow centers aligned along a longitudinal axis;

said stacked disks including alternating first and second disks;

said first disk having (a) multiple high recovery first stages located at said hollow center for receiving fluid inlet, and (b) multiple low recovery second stages in fluid communicating series with said high recovery first stages and located at said perimeter;

said second disk having (c) at least one plenum extending through the disk; and said disks selectively positioned in said stack to enable fluid flow from said high recovery first stages in one disk to said plenum in adjacent disks and to said low recovery second stages in at least said one disk, wherein the fluid flow path is split into two initial axial directions, then into said plenum with multiple radial flow directions, and then distributed through multiple low recovery second stages in at least said one disk.

* * * * *